United States Patent [19]

Pickering et al.

[11] Patent Number: 4,768,278

[45] Date of Patent: Sep. 6, 1988

[54] METHOD OF MANUFACTURING A JOINT FOR CONNECTING A SPIGOT TO THE BELL OF A PIPE OR COUPLING

[75] Inventors: Len Pickering; Gilles Lepine; Gord Burnett, all of London, Canada

[73] Assignee: Multi Fittings, London, Canada

[21] Appl. No.: 33,716

[22] Filed: Apr. 3, 1987

Related U.S. Application Data

[62] Division of Ser. No. 845,857, Mar. 27, 1986.

[51] Int. Cl.$^4$ .......................... F16J 15/10; B23P 11/00
[52] U.S. Cl. ........................................ 29/511; 29/521; 277/207 A
[58] Field of Search ................. 29/509, 510, 511, 521; 277/207 A

[56] References Cited

U.S. PATENT DOCUMENTS

| | | | |
|---|---|---|---|
| 1,804,284 | 5/1931 | Smith | 29/510 |
| 3,493,237 | 2/1970 | Kleindinst | 277/207 A X |
| 4,343,480 | 8/1982 | Vassallo | 277/207 A |
| 4,510,664 | 4/1985 | Lock | 29/469.5 X |
| 4,543,112 | 9/1985 | Ackley et al. | 29/511 X |
| 4,546,529 | 10/1985 | Leon | 29/511 X |

*Primary Examiner*—Timothy V. Eley
*Attorney, Agent, or Firm*—Ivor M. Hughes

[57] ABSTRACT

A process is disclosed for manufacturing a bell end of a pipe fitting or coupling carrying a gasket. The bell has a mouth at the open end thereof and a longitudinally-extending axis, the bell carrying an annularly-extending groove securing an annularly-extending gasket; the groove comprising a bottom, a rearward wall joined to the bottom on the end of the bottom remote from the mouth of the bell, the rearward wall extending away from the bottom at an angle less than or equal to 90 degrees, the bottom terminating forwardly at a radially outwardly-directed wall and an offset longitudinally-extending wall portion extending from the end of the radially outwardly-directed wall remote from the bottom and being bent over to extend into the bell. The gasket comprises a body of resilient yieldable material and has a bottom wall for seating on the bottom of the annularly-extending groove, a rear portion for abutting the rearward wall of the groove, a sealing lip portion on the side of the body portion remote the bottom wall for engaging the spigot end of a pipe inserted into the bell, and a forward offset portion proximate the bottom conforming in shape to the space between the end wall extending from the forward end of the bottom of the groove in the bell and the bent-over, curved, thinner, longitudinally-extending wall.

26 Claims, 5 Drawing Sheets

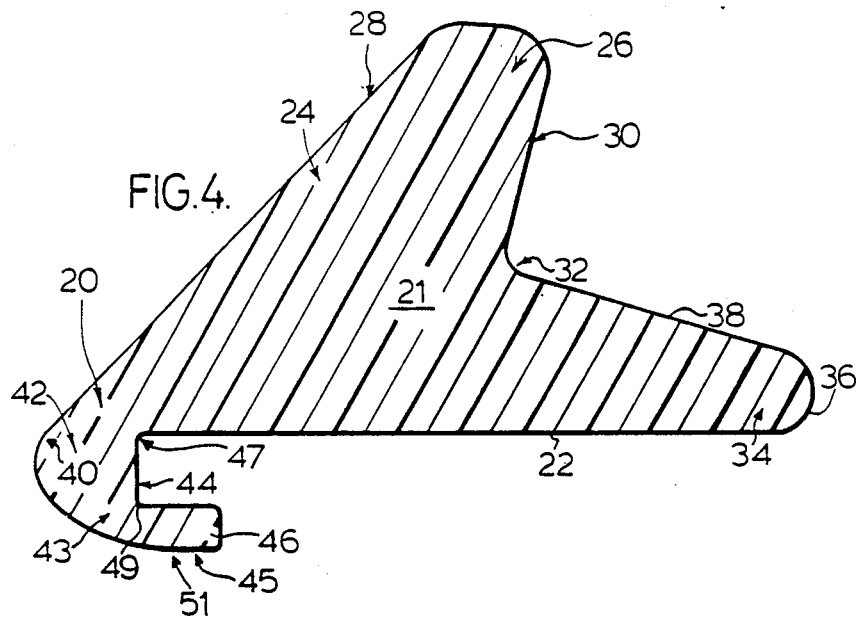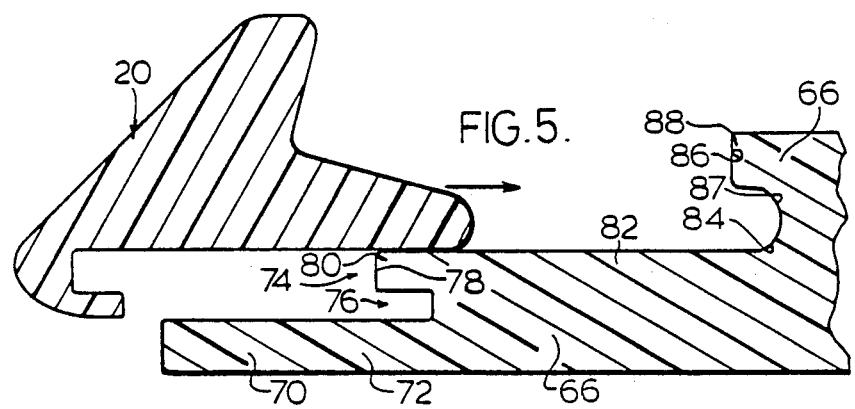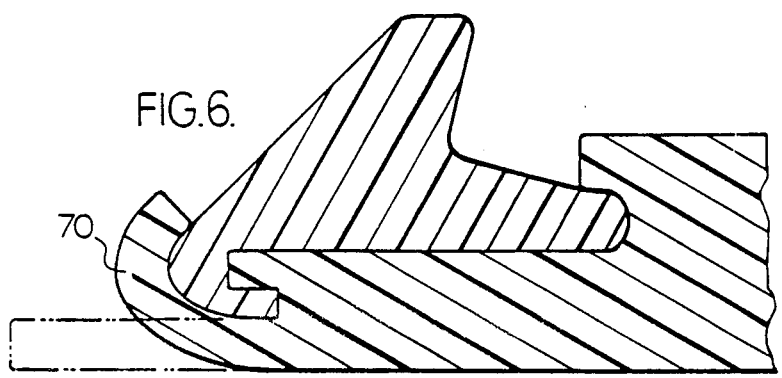

METHOD OF MANUFACTURING A JOINT FOR CONNECTING A SPIGOT TO THE BELL OF A PIPE OR COUPLING

This is a divisional application of U.S. application Ser. No. 06/845,857 filed Mar. 27, 1986.

FIELD OF INVENTION

This invention relates to joints for connecting lengths of pipe together and specifically joints connecting bells of pipe fittings or couplings (ends of tubular members) to spigots of extruded plastic pipes or fittings using a gasket secured in each bell (tubular member).

BACKGROUND OF THE INVENTION

Joints between bells (tubular members) and spigots for connecting plastic pipe sections together employing a resilient, yieldable gasket therebetween are not new. Such joints comprise a gasket normally secured in a recess of a bell or tubular end at the expanded end of the tubular member (a pipe fitting or coupling for example) for sealing against the outer end surface of a spigot. Such joints offer a quick method of pipe installation which is economical and easy to assemble, thereby eliminating the need for skilled pipe fitting personnel and permitting semi-skilled installers to form the joint. However, as the reader will appreciate, the formation of the seal is paramount. If a satisfactory seal is not the end result of inserting the spigot end into the bell or tubular end of the tubular member (pipe fitting or coupling), then the resultant losses and the ultimate repair can be extremely costly, for example, where the pipe has been buried or embedded in concrete. Hence, the seal created must continue to exist under all conditions to preclude a leakage radially inwardly into the pipe or radially outwardly from the pipe, or both, depending on the application (for example, vacuum, low pressure, high pressure situations) and to ensure the seal is maintained even where there is a shifting in the spigot-bell connection of the pipe buried in the ground. As a result of these requirements, many industry standards have been established, for example, ASTM, and CSA testing criteria to verify the integrity of seals at joints of various applications. In one application, a sewer pipe joint must be able to withstand a test of applied pressure at 10.8 p.s.i. gauge for 10 minutes without a reduction in that pressure. In vacuum applications the tests have required that the pipe system joint must hold 22 inches of mercury for 20 minutes without the gasket joint leaking more than 1 inch of mercury in the first 10 minutes and without the joint leaking more than 5 inches of mercury in the second 10 minute period (see ASTM D3212 Standard).

In order to ensure the integrity of the seal, the gasket must be of such shape and size as to permit uniform annular compression applied by the spigot of the pipe as the spigot is inserted into the bell and after assembly, maintain the positive seal under all conditions applied to the joint. Further, the gasket must prove reliable over a long period of time in use and not sag, elongate, move, slip or disintegrate and must remain pliable, resilient and firm in its intended position to maintain the seal first created. (Applicant directs the reader's attention to ASTM-476 and F477 and CSA standards B182.1 and B182.2 [M1983] and incorporates the teachings thereof by reference).

As a result of the stringent requirements, many different methods and configurations have been proposed for creating a seal using a gasket in a bell between the bell and the spigot. For example, U.K. Pat. No. 1,168,040 teaches a pipe coupling employing a bell (tubular member) with a radially in-turned lip to retain a sealing ring and an incompressible locking ring dividing the ring into three parts. Other joints are taught in German Pat. No. 2,205,532, U.S. Pat. Nos. 3,915,460, 3,217,092, 4,034,994, German Pat. No. 1,118,551, U.S. Pat. No. 4,097,074, U.K. Pat. No. 1,033,756 and U.S. Pat. No. 4,143,884. Compound elastomeric elements for assisting to create a seal for example, having more than one resilient member working in unison, are taught in U.S. Pat. Nos. 2,272,811 and 3,265,410.

U.S. Pat. Nos. 2,146,641, 2,980,449, 3,265,410, 3503,619, and 4,018,461 teach further gasket-bell configurations used in an attempt to form more secure joints. U.S. Pats. Nos. 2,953,398, 2,991,092 3,244,797, 3,315,971, 4,097,074, and 4,343,480 (corresponding to Canadian Letters Pat. No. 1,158,277), teach various gasket formations having forward and rearward restraining surfaces including a rearward corner for supporting a gasket in a further attempt to provide an improved joint. U.S. Pat. No. 3,520,047 teaches the shaping of the end of the pipe bell from thermoplastic material as well as a form of elastomeric joint in an attempt to provide an improved joint. The method taught by the said Patent teaches a deforming core (see FIG. 9) around which a thermosplastic pipe bell may be formed.

U.S. Pat. 3,362,717 is another attempt to provide a suitable joint, teaching the use of a rearward shoulder section of the gasket acting with the bell in unison to provide reinforcement of the seal's ability to remain fixed in its sealing position. The addition of the sheath shown in FIG. 1 is taught to enhance the sealing properties of the joint by coming in contact with 15A of FIG. 2 and area 5 of FIG. 1 of the main gasket.

U.S. Pat. No. 3,741,570 teaches a flexible joint for a sewer pipe with a blunt-cut spigot end. The formed joint comprises a forward shoulder or surface and rearward shoulder or edge upon which the gasket abuts during compression and insertion of the spigot end whereby the rearward shoulder prevents, according to the teachings of the Patent, the gasket from rolling out of position during the insertion process.

U.S. Pat. No. 2,620,206 disloses a pipe coupler seal which incorporates latches and keeprs 15 and 14 respectively as shown in FIG. 1, which purport to secure split collar 17 in place. Wall 23 seen in FIG. 3 has been formed by cutting radially outwardly from the inner surface of the coupling to provide an abutment shoulder 21a and annular walls 22 and 23 for receiving gasket 12. Gasket 12 is inserted into the completed groove and thus if inserted can be removed.

In the same vein as U.S. Pat. No. 2,620,206, Applicant has become aware subsequent to its invention to a pipe and a bell joint manufactured by Dyka International BV of Amsterdam, Holland which incorporates the front of a gasket being secured by a bent-forward lip and which gasket, extends rearwardly along the inner surface of the bell.

It is therefore an object of this invention to provide an improved joint between the bell of a pipe fitting or coupling (end of a tubular member) and spigot, incorporating a gasket secureably mounted in the bell in a simple yet highly reliable manner to provide a more effective and reliable seal which seal, when formed by semi-skilled or even unskilled workers, is easily formed. It is a further object of the invention to provide improved components therefor, including gasket and bell. It is still a further object of the invention to provide an improved gasket-bell assembly for use to form the improved joint and method for securing the gasket in the bell.

It is a further object of this invention to firmly secure the elastomeric gasket seat at its forward and rearward ends without the need of cements or adhesives. It is a further object of this invention to provide a configuration of a bell on the end of a pipe fitting or coupling (end of a tubular member) which, when used to secure a gasket during assembly, so secures the gasket in the bell (end of tubular member) such that it remains so during use. It is a further object of the invention to provide a method of manufacturing the bell carrying the gasket (end of the tubular member carrying the gasket).

Further and other objects of the invention will be apparent to those skilled in the art from the following summary of the invention and detailed description of embodiments thereof.

SUMMARY OF THE INVENTION

According to one aspect of the invention, there is provided an end portion of a generally tubular member having a central longitudinal axis, the end portion defining a mouth at its very end and an annular groove axially spaced from said mouth for receiving a gasket, the annular groove presenting a bottom wall, one end of the bottom wall being proximate the mouth and the other end being axially spaced from said mouth, said bottom wall having at said end proximate said mouth a generally radially-extending wall extending generally away from the central longitudinal axis, and said bottom wall having at its other end axially spaced from the said mouth a radially-extending wall extending toward the central longitudinal axis and being angled about 90 degrees to the bottom wall, the generally radially-extending wall extending generally radially away from the central longitudinal axis carrying at its end spaced from the bottom a longitudinally-extending wall extending towards the mouth and being bent over at its end to provide a bent over portion extending into the end portion of the generally tubular member, the gasket being annular and comprising a body of resilient yieldable material carrying an integral sealing lip portion, the body having a central longitudinal axis and having opposed ends interconnected by a bottom wall substantially parallel to the axis for seating on the bottom wall of the groove, one opposed end of the gasket terminating in a generally radially-extending wall for engaging the radially-extending wall at the end of the bottom of the groove extending towards the central longitudinal axis of the tubular member and spaced from the mouth, the other opposed end of the gasket comprising a portion extending generally angularly away from the body for being engaged between the bent over portion of the longitudinally-extending wall and the generally radially-extending wall extending generally radially away from the central longitudinal axis, the integral sealing lip portion being on the side of the body of the gasket opposite the bottom and extending angularly away from the body and the mouth of the tubular portion and terminating at an end portion radially spaced from the body on the side of the body closer the central longitudinal axis of the tubular member than the bottom of the groove (in one embodiment radially spaced from the body of the gasket with no gasket material between the body and the end portion) whereby, the longitudinally-extending wall having been bent over the opposed end of the gasket comprising the portion extending generally angularly away from the body and the engagement of the portion of the gasket extending generally angularly away from the gasket at the other opposed end of the gasket against the generally radially-extending wall extending away from the central longitudinal axis of the tubular member, and the engagement of the generally radially-extending wall of the opposed end of the gasket against the radially-extending wall extending towards the central longitudinal axis of the tubular member and being angled about 90 degrees to the bottom wall locks the gasket body against movement longitudinally in the direction away from the mouth so that upon the entry of a spigot the sealing lip portion is permitted to stretch away from the mouth (with the gasket body confined or constrained between the forward end of the tubular member and rearward wall [the radially-extending wall extending towards the central longitudinal axis of the tubular member and being angled about 90 degrees to the bottom wall]) decreasing the radial thickness of the sealing lip portion thus reducing the required insertion force for inserting the spigot into the end portion of the tubular member without compromising the integrity of the seal formed and permitting the sealing lip portion to fold onto the body of the gasket after the leading end of the spigot has passed the body of the gasket thereby providing an effective seal.

In one embodiment the radially-extending wall extending toward the central longitudinal axis is angled less than about 90 degrees.

In another embodiment the radially-extending wall extending toward the central longitudinal axis is angled substantially 90 degrees to the longitudinal axis.

According to another aspect of the invention, the generally radially-extending wall extending from the bottom of the groove away from the central longitudinal axis of the tubular member extends away from the central longitudinal axis at an angle of about 90 degrees thereto and the portion of the gasket extending generally angularly away from the body may extend radially away at an angle of about 90 degrees to the longitudinal axis of the body.

According to another aspect of the invention, the generally radially-extending wall extending from the bottom of the groove away from the central longitudinal axis of the tubular member may comprise a recess opening therethrough (into the tubular member material) spaced from the bottom of the groove, and the portion of the gasket extending generally angularly away from the body may carry a portion for sitting in the recess.

According to another aspect of the invention, the end of the sealing lip portion may overly the body of the gasket so that the end of the sealing lip portion may engage the gasket body when the sealing lip is folded onto the body of the gasket.

According to another aspect of the invention, the radially-extending wall at the other end of the bottom of the groove extending toward the longitudinal axis may form an arc directed towards the mouth of the tubular member.

According to another aspect of the invention, the arc may be an arc of a circle.

According to another aspect of the invention, the radially-extending wall at the other end of the bottom of the groove extending toward the longitudinal axis terminates in a lip directed longitudinally towards the mouth of the tubular member.

According to another aspect of the invention, the generally radially-extending wall extending away from the central longitudinal axis proximate the mouth of the tubular member may have a longitudinally-directed recess therein extending in a direction longitudinally away from the mouth and being radially spaced from the bottom wall of the groove, and the other end of the gasket comprising a portion extending generally angularly away from the body for being engaged between the bent over portion and the generally radially-extending wall extending away from the central longitudinal axis of the tubular member may comprise a portion of the same shape and size as the recess for lodging in the longitudinally-directed recess.

Therefore, when the longitudinally-extending wall is bent over into the mouth of the tubular member over the opposed end of the gasket comprising the portion extending generally angularly away from the body which is against the generally radially-extending wall extending away from the central longitudinal axis of the tubular member, and with the generally radially-extending wall of the gasket engaging the radially-extending wall at the end of the bottom of the groove extending towards the central longitudinal axis of the tubular member spaced from the mouth, the gasket is locked against movement longitudinally in the direction away from the mouth so that upon entry of a spigot the sealing lip portion is permitted to stretch away from the mouth decreasing the radial thickness of the sealing lip portion thus reducing the required insertion force for inserting the spigot into the end portion of the tubular member without compromising the integrity of the seal formed and permitting the sealing lip portion to fold onto the body of the gasket after the leading end of the spigot has passed the body of the gasket thereby providing an effective seal.

According to another aspect of the invention, an improved annular gasket is provided comprising a body of resilient yieldable material carrying an integral sealing lip portion and having a central longitudinal axis, the body having opposed ends interconnected by a bottom wall extending substantially parallel to the axis, one opposed end of the gasket terminating in an end wall extending angularly (obliquely) away from the bottom wall towards the central longitudinal axis, the other opposed end of the gasket comprising a portion extending generally away from the body and the central longitudinal axis, the integral sealing lip portion being on the side of the central longitudinal axis of the body portion opposite the bottom wall and extending angularly away from the body and the portion of the gasket extending generally away from the body and the central longitudinal axis, the sealing lip portion terminating in an end portion radially spaced from the body of the gasket with no gasket material between the body and the end portion, the sealing lip portion being foldable to lie on the body of the gasket.

In one embodiment the end of the sealing lip portion may lie on the body of the gasket when the sealing lip portion is folded to lie on the body of the gasket.

In another embodiment the portion extending generally away from the body and the central longitudinal axis may include a portion on the end thereof remote the body and the central longitudinal axis, directed longitudinally towards the opposed end terminating in the end wall extending angularly away from the body towards the central longitudinal axis.

According to another aspect of the invention, a combination of a tubular member having a central longitudinal axis, a mouth at its end and an annular gasket secured therein is provided, the gasket comprising a body of resilient yieldable material having a longitudinal central axis and having an irregular shape for being anchored in the end of the tubular member, the gasket having opposed ends interconnected by an outer wall (bottom wall) extending substantially parallel to the axis, a generally radially-extending leading portion extending away from the longitudinal central axis at the end of the gasket longitudinally closet to the mouth of the tubular member, the gasket carrying a lobe at the other opposed end and a sealing surface on the side of the longitudinal central axis of the gasket body remote the outer wall (bottom wall), the sealing surface extending angularly (obliquely) away from the body and being carried by a wing extending from the body on the side of the longitudinal central axis remote the outer wall, the wing terminating at an end portion (the end portion being radially spaced from the gasket body in one embodiment with no gasket material between the end and body), the wing being foldable onto the body when the sealing surface forms a seal with the spigot, the end of the tubular member comprising, a longitudinally-extending forward wall having two ends, the end closet the mouth bent into the mouth of the tubular member to engage the generally radially-extending leading portion of the gasket extending away from the longitudinal central axis, the other end of the longitudinally-extending forward wall being integral with a generally radially-directed wall extending in a direction towards the central longitudinal axis of the tubular member for abutting the generally radially-extending leading portion of the gasket extending away from the longitudinal central axis of the gasket body thereby sandwiching the generally radially-extending leading portion of the gasket extending away from the longitudinal central axis of the gasket body between the bent longitudinally-extending forward wall of the tubular member and the generally radially-directed wall extending in the direction towards the central longitudinal axis of the tubular member, an annular gasket seat extending longitudinally away from the mouth of the tubular member from the end of the radially-directed wall extending in the direction towards the central longitudinal axis, the annular gasket seat extending longitudinally to a generally radially-extending wall on teh side of the gasket seat remote the generally radially-directed wall, the wall on the side of the gasket seat remote the radially-directed wall extending generally radially at an angle of about 90 degrees to the gasket seat for engaging the lobe of the gasket whereby the gasket body is locked against longitudinal movement in the direction away from the mouth so that upon the entry of a spigot, the wing carrying the sealing surface is permitted to stretch away from the mouth decreasing the radial thickness of the wing thus reducing the required insertion force for inserting the spigot into the end of the tubular portion without compromising the integrity of the seal formed, permitting the wing (and preferably the end portion of the wing) to fold onto the body of the gasket after the leading end of the spigot has passed the wing thereby providing an effective seal.

In one embodiment the wall of the tubular member extending generally radially at an angle of about 90 degrees from the annular gasket seat may be angled at an angle less than about 90 degrees.

According to another embodiment of the invention, the wall of the tubular member extending generally radially at an angle of about 90 dgrees may be angled at an angle substantially 90 degrees.

According to another embodiment of the invention, the generally radially-extending leading portion of the gasket may carry at its end remote the body, a portion (projection) extending in a direction longitudinally away from the mouth of the tubular member and the radially-directed wall extending in a direction towards the central longitudinal axis of the tubular member may carry a recess opening therethrough spaced from the gasket seat for receiving the portion carried by the generally radially-extending leading portion of the gasket extending in a direction longitudinally away from the mouth of the tubular member.

According to another aspect of the invention, the end of the wing of the gasket is of such length so that the end of the wing engages the body of the gasket when the wing is folded onto the body of the gasket.

According to another aspect of the invention, a bell end of a tubular member (pipe fitting or coupling) is provided, the bell having a mouth at the open forward end thereof and having a central longitudinally-extending axis, the bell being radially outward from the axis and carrying an annularly-extending groove extending from proximate the open forward end to a rearward end spaced from the open forward end, the groove securing an annularly-extending gasket, the groove comprising a bottom, a rearward wall at the rearward end of the groove joined to the bottom on the end of the bottom remote from the mouth of the bell, the rearward wall extending away from the bottom at an angle less than or equal to 90 degrees (and preferably forming an arc, for example, of a circle directed towards the mouth of the bell) and preferably terminating in a lip directed longitudinally towards the mouth of the bell, the bottom terminating forwardly at a forward wall portion, preferably the bottom terminating forwardly at an outwardly directed wall preferably a radially outwardly-directed wall (preferably having an integral longitudinally-directed groove or recess therein of a specified cross-sectional configuration [for example, rectangular or square] radially spaced from the bottom), and a longitudinally-extending wall portion preferably longitudinally-extending thinner wall portion extending from the end of the forward wall portion (for example outwardly-directed wall) remote from the bottom and, the longitudinally-extending wall portion, (for example longitudinally-extending thinner wall portion) being bent over to extend into the bell; and the gasket comprising a body of resilient yieldable material and having, a bottom wall for seating on the bottom of the annularly-extending groove and for connecting a forward portion and rearward portion of the gasket, the rearward portion for abutting the rearward wall of the groove, and an angled (for example obliquely angled) sealed lip portion on the side of the body portion remote the bottom wall for engaging a spigot inserted into the bell (and upon being stretched away from the mouth, its radial thickness is reduced, thus reducing the required insertion force for inserting the spigot thereafter permitting the sealing lip portion to fold onto the body of the gasket after the leading end of the spigot has passed the body of the gasket to provide a seal between the bell and spigot), the forward portion of the gasket proximate the bottom for being engaged by the bent-over longitudinally-extending wall portion (for example longitudinally-extending thinner wall portion) and being locked thereby when the longitudinally-extending wall portion (or longitudinally-extending thinner wall portion) is bent over to secure the forward portion of the gasket, (preferably where the bottom of the groove terminates forwardly at an outwardly-directed wall and the longitudinally-extending wall portion extends forwardly therefrom and is bent over into the mouth of the bell, the forward portion of the gasket conforms in shape to the space between the outwardly-directed wall extending from the forward end of the bottom of the groove and the bent-over curved, longitudinally-extending wall [including a portion for lodging in any longitudinally-directed recess in the radially outwardly-directed wall where the recess is present], which has been bent over to lock the gasket in position) whereby the longitudinally-extending wall, having been bent over the gasket, locks the leading edge of the gasket at the mouth of the bell and with the rearward portion of the gasket abutting the rearward wall, when the spigot is inserted into the bell and engages the sealing lip, the gasket having been anchored by the bent-over at the mouth of the bell, and having been restrained by the rearward wall (and where present the forwardly directed lip remote the mouth), the sealing lip portion is permitted to stretch rather than bunch, decreasing the radial thickness of the gasket as the spigot is inserted, (thus reducing the required insertion force for inserting the spigot into the bell without compromising the integrity of the seal) radially compressing the sealing lip portion permitting the sealing lip portion to fold onto the body of the gasket, precluding the entry of foreign matter into the groove behind the gasket.

According to another aspect of the invention, an improved gasket is provided comprising a longitudinally-extending body portion having a central longitudinal axis, a forward end, a rearward end, a bottom wall joining the forward and rearward ends and a sealing surface spaced from the bottom, the sealing surface comprising a sealing wing or lip extending angularly (for example obliquely) away from the body in a direction from the front to the rear of the gasket, the end of the lip or wing being of a length when compressed and folded, to lie on the body portion, the forward end of the gasket carrying a portion extending away from the bottom wall of the body in a direction away from the bottom wall remote the central longitudinal axis, (for example an annular hook portion extending in a direction generally away from (for example normal) to the central longitudinal axis and away from the bottom, being closer to the bottom than it is close to the sealing surface).

According to another aspect of the invention, a process of manufacturing a tubular member-gasket assembly is provided whereby a gasket (as previously described) is secured in the end of a tubular member a previously described, the process comprising the steps of:

(a) placing the gasket in the mouth of the tubular member with the end of the gasket comprising the portion extending generally angularly away from the body abutting against the generally radially-extending wall extending away from the central longitudinal axis of the tubular member (and where present on the portion of the gasket extending generally angularly away from the body the portion extending longitudinally away from the mouth is disposed in a recess through the radially-extending wall of the tubular member spaced from the bottom of the groove) and the opposed end of the gasket terminating in the generally radially-extending wall engaging the radially-extending wall at the end of the bottom of the groove extending towards the central longitudinal axis of the tubular member, and (b) bending over the longitudinally-extending wall extending towards the mouth at its end to provide a bent-over portion extending into the end portion of the generally tubular member for sandwiching the opposed end of the gasket comprising the portion extending generally angularly away from the body between the bent over portion of the longitudinally-extending wall and the generally radially-extending wall extending away from the central longitudinal axis of the tubular member with the generally radially-extending wall of the opposed end of the gasket abutting against the radially-extending wall extending toward the central longitudinal axis, thereby locking the gasket at the mouth of the tubular member.

According to another aspect of the invention, a process of manufacturing the improved bell-gasket assembly (the end of a tubular member-gasket assembly) is provided whereby a bell is provided on the end of a pipe fitting or coupling (tubular member), the bell comprising a mouth, a leading edge and central longitudinally-extending axis, a longitudinally-extending forward wall portion (preferably a longitudinally forwardly-extending thin wall at the leading edge of the bell) extending parallel to the longitudinally-extending axis, the forward wall portion terminating at an inwardly-extending wall extending towards the central longitudinally-extending axis and terminating at an annular longitudinally-extending bottom wall (preferably a thin forwardly-extending wall terminates at its rear end in an inwardly-extending wall extending towards the axis, in one embodiment a radially inwardly-extending wall having a longitudinally-directed groove or recess therein opening through the radially-extending wall, the recess or groove of specified cross-sectional configuration (for example, rectangular or square)), the bottom wall which extends longitudinally rearwardly from the inwardly-extending wall, terminating in a rearward wall extending radially away from the bottom at an angle less than or equal to 90 degrees (preferably forming an arc (for example, of a circle) directed towards the mouth of the bell and preferably terminating in a lip directed longitudinally towards the mouth of the bell); and the gasket having a central longitudinal axis and comprising a forward end, rearward end, bottom wall joining the foward and rearward ends, and sealing surface spaced from the bottom wall of the gasket, the sealing surface carrying a sealing wing or lip which, when stretched and compressed, lies on the body of the gasket, the forward end comprising an annular generally radially-extending leading portion, (in one embodiment carrying a portion (projection) extending longitudinally towards the rearward end and for example comprising an annular hook portion), connected to the bottom wall of the gasket, and carrying a wall of substantially the same shape as the wall extending inwardly from the longitudinally-extending forward wall portion at the leading edge of the bell (and any longitudinally-extending recess or groove opening through the inwardly-extending wall) for abutting the wall and for sitting in the recess or groove; the steps of inserting the gasket into the bell abutting the wall of the gasket of substantially the same shape as the wall extending inwardly from the longitudinally-extending forward wall portion of the bell, with the wall extending inwardly from the longitudinally-extending forward portion (and where present with the portion extending longitudinally towards the rearward end of the gasket carried by the generally radially extending leading portion sitting in the recess or groove) and the rearward portion of the gasket abutting the rearward inwardly-extending wall extending from the bottom wall at an angle less than or equal to 90 degrees and bending over the longitudinally extending forward wall in one embodiment the longitudinally forwardly-extending thin wall) and pushing it into the mouth of the bell over the front portion of the gasket, thereby locking the gasket at the leading edge of the bell.

According to another aspect of the invention, the combination of a bell end of a pipe fitting or coupling, and a gasket secured therein may be provided, the gasket being annular, comprising a body of resilient yieldable material having a central longitudinal axis and having an irregular shape, for being anchored in the bell end of the pipe fitting or coupling the gasket having a bottom gasket seat, a laterally-extending leading portion at one end of the gasket seat extending away from the gasket seat away from the central longitudinal axis (for example, a hook portion), a rearward portion or lobe at the other end of the gasket seat, a sealing surface extending from the side of the gasket remote the gasket seat, the sealing surface comprising an outer surface extending angularly (preferably obliquely) from the body, at least a portion of the surface being carried by a wing or lip extending angularly (preferably obliquely) from the body in a direction towards the rear portion or lobe of the gasket body, the wing or lip being stretchable and foldable to lie on the body of the gasket, the laterally-extending portion having a forwardly generally curved outer surface portion at the leading edge thereof and a rearward wall (of a predetermined configuration) extending from the gasket seat, the bell of the pipe fitting or coupling comprising a mouth, a central longitudinal axis and an annular longitudinally-extending forward wall portion bent towards the central longitudinal axis adjacent the front of the bell into the mouth of the bell, the rear end of the forward wall portion being secured to an inwardly-directed wall (having a complementary formation to the predetermined configuration of the rearward wall of the gasket extending from the gasket seat to permit the two walls to abut one another), an annular gasket seat extending rearwardly from the inwardly directed wall of the bell to a rearward inwardly-directed wall extending at an angle less than or equal to 90 degrees (and preferably being an arc of a circle preferably terminating in a forwardly longitudinally-extending lip) for providing a rearward anchor for the gasket, whereby when the gasket seat of the gasket engages the gasket seat of the bell, the rearward lobe of the gasket engages the rearward inwardly-directed wall of the bell and the laterally-extending portion of the gasket is locked in the space between the bent annular longitudinally-extending forward wall portion and inwardly-directed wall, when a spigot is inserted into the bell and directed by the bent forward wall into the bell, the spigot engages the sealing surface of the gasket stretching the wing or lip rather than bunching it, thereby decreasing its radial thickness, radially compressing the wing or lip, folding it towards the body of the gasket, thus reducing the required insertion force for inserting the spigot into the bell without compromising the integrity of the seal and thus precluding the entry of foreign matter into the groove behind the gasket.

Preferably, the forwardly generally curved outer surface portion commences at a position on the laterally-extending portion longitudinally closer the rearward portion or lobe of the gasket than the juncture of the rearward wall of the laterally-extending portion and the gasket seat for assisting to preclude radial inward movement of the laterally-extending portion of the gasket towards the central longitudinal axis from its portion in the bell when the longitudinally-extending forward wall (preferably forward thinner wall) is bent over to secure the gasket in the bell.

According to another aspect of the invention, there is provided a bell end of a pipe fitting or coupling, the bell having a mouth at the open end thereof and having a central longitudinally-extending axis the bell carrying an annularly-extending groove securing an annularly-extending gasket, the groove comprising a bottom, a rearward wall joined to the bottom on the end of the bottom remote from the mouth of the bell, the rearward wall extending towards the longitudinally-extending axis and away from the bottom at an angle less than or equal to 90 degrees, the bottom terminating forwardly at an offset forward wall portion offset to the bottom, the forward wall portion being bent over to extend into the bell, and the gasket being annular and comprising a body of resilient, yieldable material having a bottom wall for seating on the bottom of the annularly-extending groove, a rear portion for abutting the rearward wall of the groove, a sealing lip portion on the side of the body portion remote the bottom wall for engaging a spigot inserted into the bell end, and a forward portion of the gasket offset the bottom of the gasket and being further from the sealing lip portion than the bottom of the gasket for being engaged by the bent over offset forward wall portion and being locked thereby when the forward wall portion is bent over to secure the forward portion of the gasket whereby when the offset forward wall portion, having been bent over the gasket locks the leading edge of the gasket at the mouth of the bell and with the rearward portion of the gasket abutting the rearward wall, when a spigot is inserted into the bell and egages the sealing lip, the sealing lip is permitted to stretch, decreasing the radial thickness of the gasket as the spigot is inserted, thus reducing the required insertion force for inserting the spigot into the bell without comprising the integrity of the seal and thus precluding the entry of foreign matter into the groove behind the gasket. Preferably the end of the sealing lip portion overlies the body of the gasket and is radially spaced from the gasket body with no gasket material between the body and the end, the sealing lip portion being foldable onto the gasket body so that the end of the sealing lip portion engages the gasket body when the sealing lip is folded onto the body of the gasket. In one embodiment the offset forward portion of the gasket carries a projection directed longitudinally towards the rear portion of the gasket and a recess is provided in the tubular member between the bottom of the groove and offset forward wall portion for receipt of the projection.

The invention will now be illustrated with reference to the following drawings of embodiments of the invention and detailed description thereof.

BRIEF DESCRIPTION OF THE DRAWINGS

FIG. 4 is a cross-sectional view of the gasket in a non-deformed state according to the preferred embodiment of the invention FIG. 5 is an exploded close-up cross-sectional view of some of the components seen in FIGS. 2 and 3 for assembly.

FIG. 6 is a cross-sectional view of the components shown in FIG. 5 with the gasket secured.

DETAILED DESCRIPTION OF THE DRAWINGS

Figure 2:
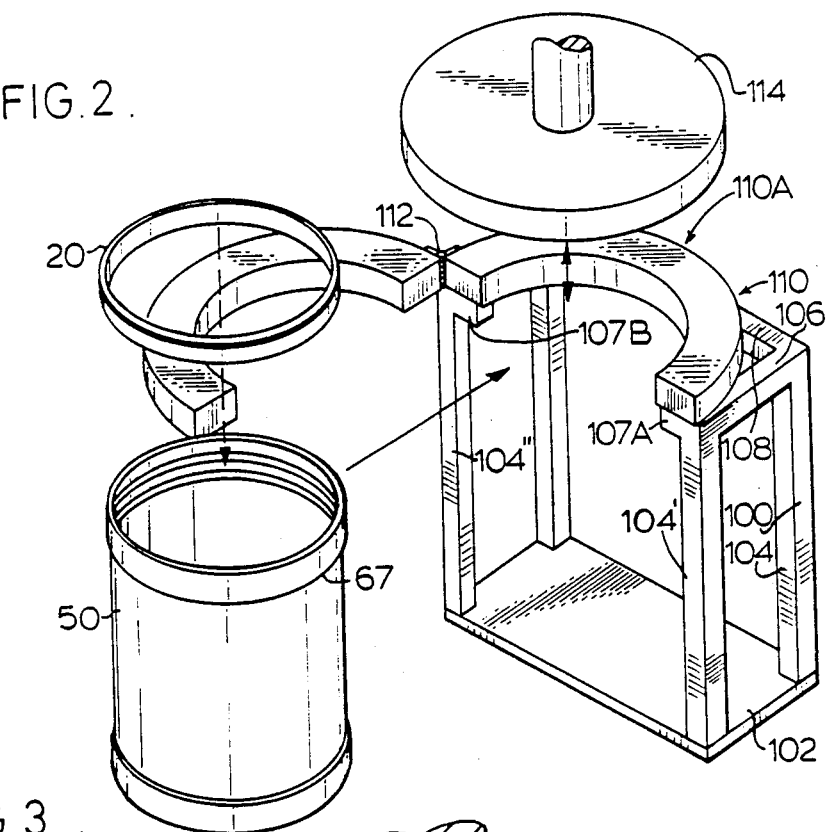
FIG. 2 is a perspective view of the components used for securing the gasket in the bell of the coupling (the end of the tubular member) manufactured according to the preferring embodiment of the invention.

With reference to FIGS. 2 and 4, resilient annular gasket 20 comprises a bottom or gasket seat 22, sealing surface 24 remote bottom 22, sealing surface 24 carrying sealing surface portion 28 of wing or lip 26. Surface 24 is sloped angularly obliquely away from the leading edge of gasket 20 radially inwardly to the radial inward edge of wing or lip 26. Rearward, side 30 of lip 26 slopes generally radially inwardly and towards the front of gasket 20 so that when bent at 32, it will overlie longitudinally-extending gasket body portion 21. Rear portion 34 of gasket 20 has circular curved outer wall surface 36 and is joined to point 32 by side 38, sloped radially angularly forwardly. At the leading edge 40 of gasket 20, hook portion 42 extends generally normal to bottom 22 and includes frontal curved portion 43 and rear wall formation 44 comprising rectangular resilient portion 46 extending longitudinally rearwardly from connector 45. Curved portion 43 begins at point 51 remote bottom 22 and is longitudinally closer to rear wall surface 36 than the juncture 49 of portion 46 with connector 45.

Figure 1:
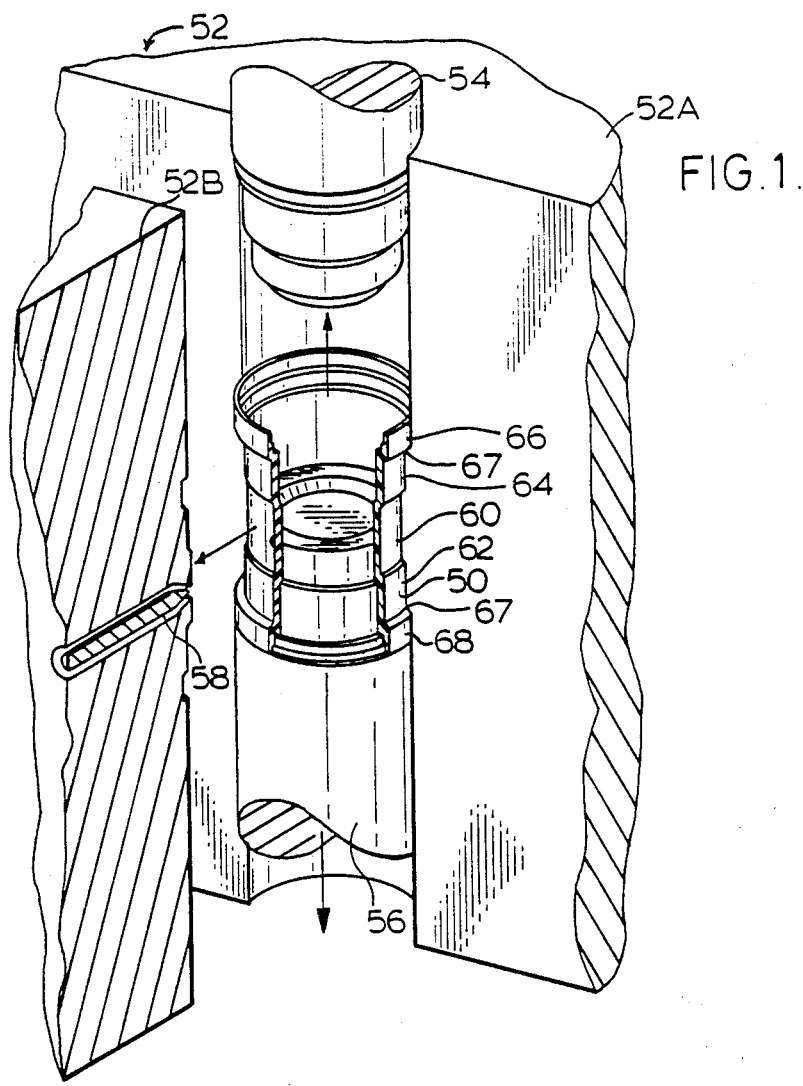
FIG. 1 is a perspective partially-exploded view, partly in cross-section, of the mould of an injection moulding apparatus used in the manufacture of a preferred embodiment of the invention.

Coupling or tubular member 50 (see FIG. 2) is injection moulded with reference to injection moulding apparatus in FIG. 1. With reference to FIG. 1, mould 52 is shown as comprising male mould members 54 and 56 inserted into female mould portion 52 formed by two halves 52A and 52B. After plastics material is injected into the mould through nozzle 58, the preferred embodiment of the invention is the result and the plastic-cooled coupling 50 ejected.

With reference to FIG. 1, coupling 50 comprises annular central connecting wall 60, radially of lesser diameter than any pipe spigot to be introduced into the coupling. Wall 60 is connected on either axial end to annular walls 62 and 64 which have a radius greater than any pipe spigot that may be introduced into coupling 50. Axially forwardly of each of walls 62 and 64 are bells 66 and 68. As can be seen, the interior configuration of the mould is such to provide the resultant component parts of coupling 50, including connector wall 60, wall 62 and 64, and bells 66 and 68. Each of bells 66 and 68 in cross-section has a configuration shown in FIG. 5.

Figure 3:
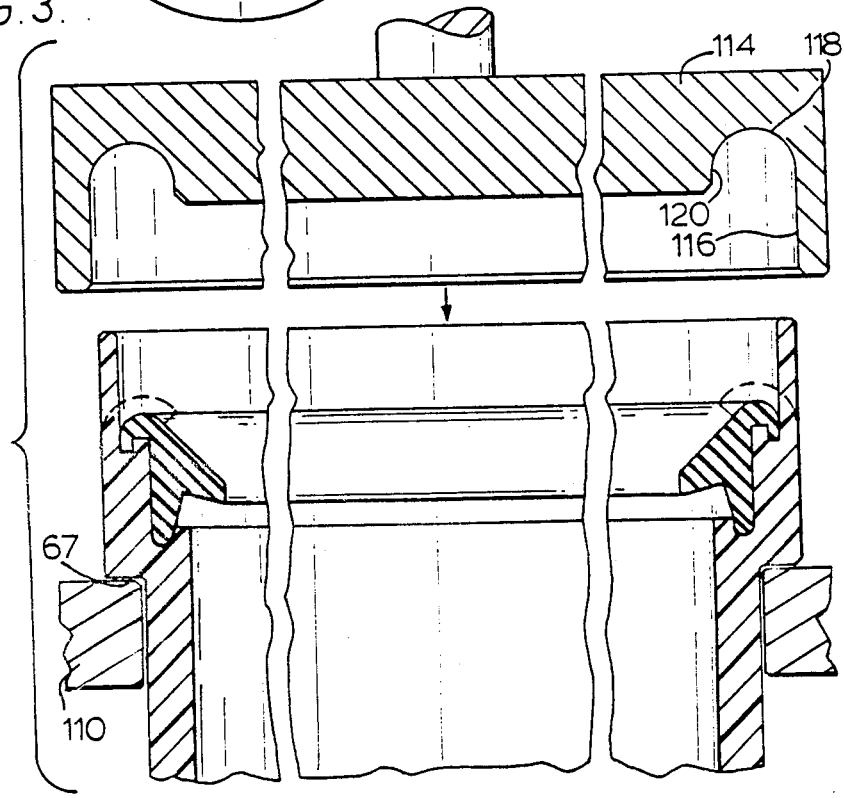
FIG. 3 is a front, cross-sectional view of the components in FIG. 2, aligned and ready for use to secure the gasket in the coupling according to the preferred embodiment of the invention.
Figure 7:
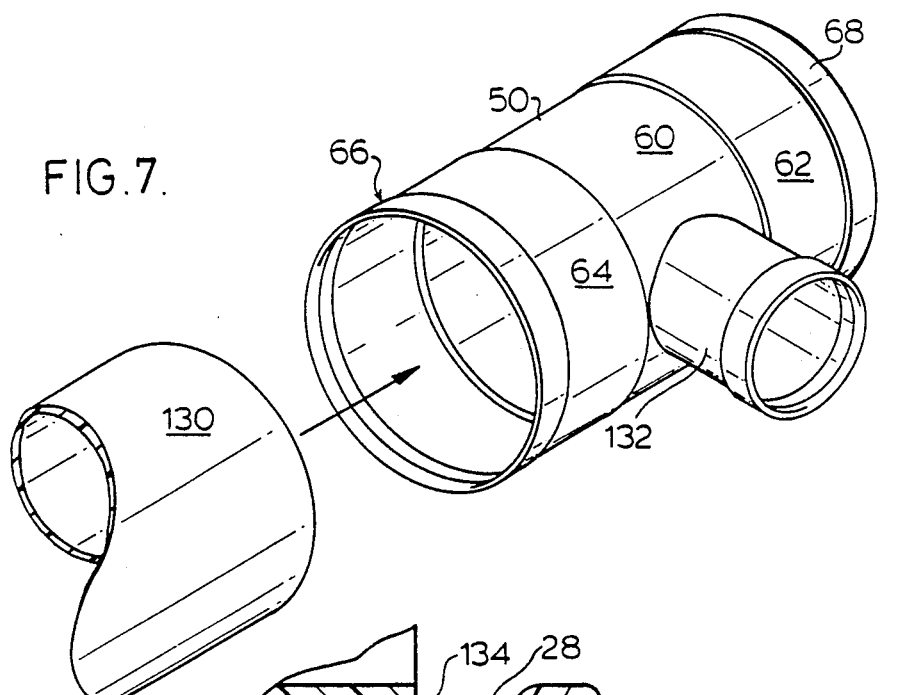
FIG. 7 is a perspective view of a fitting constructed according to a preferred embodiment of the invention being used to secure the spigot end of a pipe to it.

With reference to FIG. 5, bell 66 extending from wall 64 comprises longitudinally or forwardly-extending front thin wall 70 extending at its rear end 72 to radially inwardly-extending wall formation 74, comprising a rectangular recess 76, proximate wall 70 at its rear end 72 to conform in size and shape to portion 46 of gasket 20 and carry wall portion 78 of the same length as portion 44 of gasket 20 shown in FIG. 4 so that wall 45 of hook portion 42 including portion 46 abuts wall 70 when gasket 20 is placed in the manner shown in FIG. 3 in bell 66, corner 47 of gasket 20 engages corner 80 of coupling 66. Gasket seat or seat bottom 82 for receiving bottom 22 of gasket 20 extends longitudinally rearwardly from corner 80, is of a length to accommodate bottom 22 and, terminates in radially inwardly-curved rear wall 84, curing in arc 87 (a part thereof being circular) radially inwardly and forwardly. Lip 88 overlies arc 87 and extends longitudinally forwardly to point 86 thus providing a forwardly opening second groove at the rear of the bottom 82.

For securing gasket 20 into bell 66 and locking it in bell 66, gasket 20 is positioned such that bottom 22 sits on bottom 82, rear edge 36 abuts arc 87 of the forwardly opening second groove, portion 46 of hook portion 42 sits in recess 76, and wall formation 44 abuts portion 78, and thinner wall 70, (thinner than the thickness of bell 66 radially outwardly from bottom 82) is bent over outer edge 43 of gasket 20, compressing hook portion 42 of gasket 20 and locking it in position (see FIG. 6).

For bending wall 70 to the position shown in FIG. 6 and with reference to FIGS. 2 and 3, stand 100 and press 114 are used. Stand 100 comprises base 102 supporting upright posts 104 and cross members 106 and 108 for connecting the tops of posts 104, inwardly directed lips 107A and 107B extending from posts 104$^1$ and 104$^{11}$ at the front of the stand, and support ring structure 110 made up of two halves, 110A, one of which is fixed to supports 106 and 108 and to lips 107A and 107B. The other half 110A of structure 110 is pivotally secured at 112 to the supported half 110A. The opening when sections 110A are closed to form annular support 110 is to permit wall 64, 60 and 62 to pass therethrough, but not bells 66 and 68. This is because of a ledge 67 connecting wall 64 to bell 66 or wall 62 to bell 68. Thus bells 66 and 68 are of greater diameter than the central opening when the halves 110A of support 110 are closed together. Thus annular ledge 67 sits on support 110 when coupling 50 is seated on support 110 (see FIG. 3). Thereafter, gasket 20 is placed in bell 66 in the position shown in FIG. 3 and vertically reciprocable press 114 is reciprocated from a position spaced from support 110 to a position proximate support 110 so that when the coupling 50 is carried by support 110, press 114 will act on thinner forward wall 70 to bend it over. In this regard, the inside of press 114 includes an inner vertically-extending annular wall 116 having a radius just greater than the radius of the outer surface of annular wall 70. This wall 116 terminates upwardly in annuarly-extending semi-circular arch portion 118 which terminates in downwardly-extending wall portion 120. Thus when press 114 is brought to bear on wall 70, wall 70 is forced to conform to the inner surface shape of arch 118, thus taking up the position shown in FIG. 6, securing gasket 20 within the bell. Heating (not shown) may be utilized to facilitate this bending motion. The curving of portion 43 from point 51 being longitudinally closer to rear wall 36 than juncture 49 precludes radial inward movement of the hook formation when wall 70 is caused to be bent over to secure gasket 20 in the bell.

Figure 10:
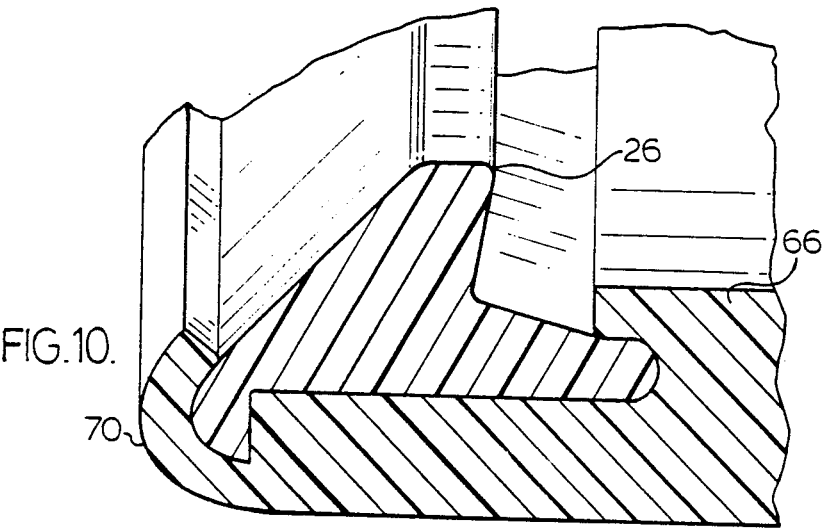
FIG. 10 shown with FIG. 1 is a partly cross-sectional perspective view of a further embodiment of the invention.

With reference to FIG. 10, an alternate form of gasket and bell is shown which does not include portions 76 in wall formation 74 of bell and protuberance or projection 46 in wall formation 44 of the hook portion of the gasket.

FIGS. 7, 8, 8A and 9 illustrate the securing of spigot 130 to fitting 50, constructed similarly to coupling 50 with added pipe fitting outlet 132 being the only difference.

Figure 8:
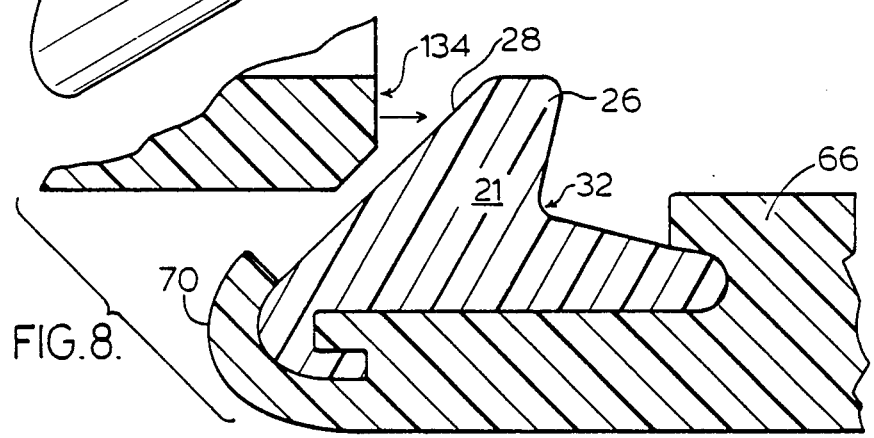
FIG. 8 is a cross-sectional view of the components shown in FIG. 7 being joined.
Figure 8A:
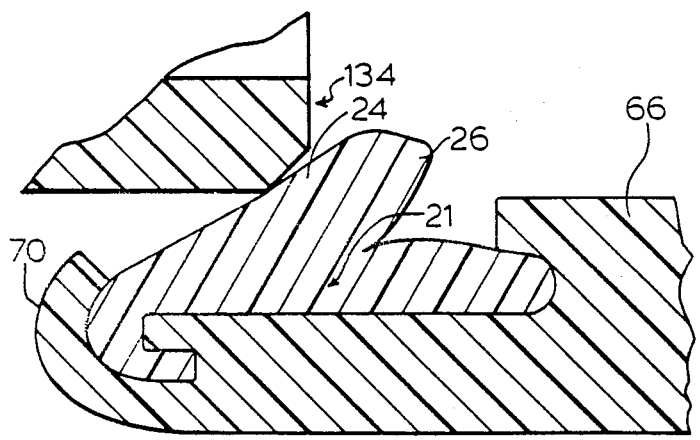
FIG. 8A is a cross-sectional view of the components shown in FIG. 8 at a later position during joining.
Figure 9:
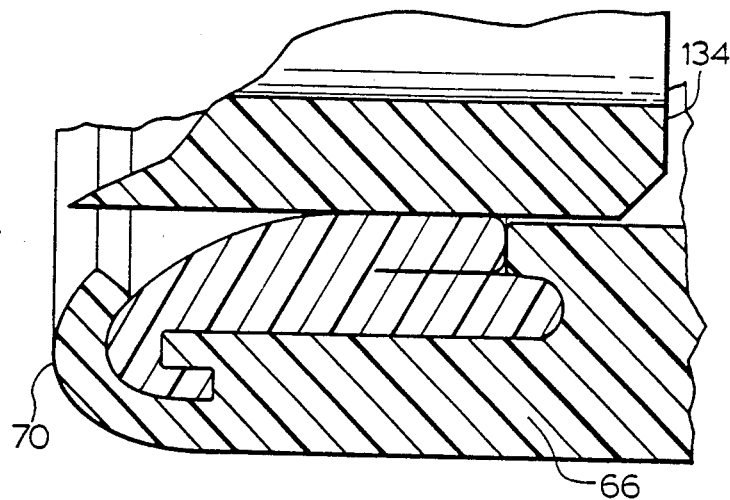
FIG. 9 is a cross-sectional view of the components shown in FIG. 8 joined together.

With reference to FIGS. 8, 8A and 9 as spigot end 134 is advanced into bell 66, it engages the outer edge 28 of sealing surface 24, stretching it and radially compressing it, thus bending lip 26 at 32, causing lip 26 to sit on body portion 21. As gasket 20 is stretched, the motion is resisted by rear corner 84 and arc 87, and by hook portion 42 locked in the space between bent-over wall 70 and wall formation 74 including portion 46 lodged in recess 76 with resists the removal of gasket 20 when the seal is effected.

As many changes can be made to the embodiments of the invention without departing from the scope of the invention, it is intended that all material contained herein be interpreted as illustrative of the invention and not in a limiting sense.

The embodiments of the invention in which an exclusive property or privilege is claimed are as follows:

1. A process of manufacturing an improved bell gasket assembly comprising a bell on the end of a pipe or coupling having a mouth, a leading edge and longitudinally-extending axis, a longitudinally forwardly-extending wall at the leading edge of the bell extending parallel to the longitudinally-extending axis, the forwardly-extending wall terminating at its rear end at an inwardly-extending wall extending towards the central longitudinally-extending axis and terminating at an annularly-extending bottom wall extending longitudinally rearwardly from the inwardly-extending wall, and terminating in a rearward wall extending radially away from the bottom towards the longitudinally-extending axis at an angle less than or equal to 90 degrees; and the gasket having a central longitudinal axis and comprising a forward end, rearward end, bottom wall joining the forward and rearward ends and a sealing surface spaced from the bottom wall of the gasket, the sealing surface carrying a sealing wing or lip which, when stretched and compressed, lies on the body of the gasket and the forward end of the gasket carrying an annular generally radially extending leading portion connected to the bottom of the gasket and carrying a wall of substantially the same shape as the inwardly-extending wall extending inwardly from the forwardly-extending wall at the leading edge of the bell; the steps of inserting the gasket into the bell abutting the wall of the gasket of substantially the same shape as the wall extending inwardly from the longitudinally-extending forward wall portion of the bell, with the wall extending inwardly from the longitudinally-extending forward portion and the rearward portion of the gasket abutting the rearward inwardly-extending wall extending from the bottom wall at an angle less than or equal to 90 degrees; and thereafter, bending over the longitudinally forwardly-extending wall and pushing it into the mouth of the bell over the front portion of the gasket, thereby locking the gasket at the leading edge of the bell.

2. The process of claim 1, wherein the rearward wall of the groove extending away from the bottom forms an arc directed towards the mouth of the bell.

3. The process of claim 2, wherein the arc is an arc of a circle.

4. The process of claim 1, 2 or 3, wherein the inwardly-extending wall extending inwardly from the forwardly-extending wall at the leading edge of the bell has a longitudinally-directed recess therein radially spaced from the bottom wall of the groove and the annular generally radially extending leading portion of the gasket comprises a projection of the same shape and size as the recess for being inserted into the recess.

5. The process of claim 3, wherein the arc of the circle directed towards the mouth of the bell terminates in a lip directed longitudinally towards the mouth of the bell.

6. The process of claim 2, wherein the arc directed towards the mouth of the bell terminates in a lip directed longitudinally towards the mouth of the bell.

7. The process of claim 1, wherein the rearward wall of the groove extending away from the body terminates in a lip directed longitudinally towards the mouth of the bell.

8. The process of claim 7, 6 or 5, wherein the iwnardly-inwardly-extending wall extending inwardly from the fowardly-extending wall at the leading edge of the bell has a longitudinally-directed recess therein radially spaced from the bottom wall of the groove and the annular generally radially extending leading portion of the gasket comprises a projection of the same shape and size as the recess for being inserted into the recess.

9. The process of manufacturing an improved bell-gasket assembly comprising, wherein the bell having a mouth at the open end thereof and having a central longitudinally-extending axis, the bell carrying an annularly-extending groove securing an annularly-extending gasket, the groove comprising a bottom, a rearward wall joined to the bottom on the end of the bottom remote from the mouth of the bell, the rearward wall extending towards the longitudinally-extending axis and away from the bottom at an angle less than or equal to 90 degrees, the bottom terminating forwardly at an offset forward wall portion offset to the bottom, the forward wall portion being bent over to extend into the bell, and the gasket being annular and comprising a body of resilient, yieldable material having a bottom wall for seating on the bottom of the annularly-extending groove, a rear portion for abutting the rearward wall of the groove, a sealing lip portion on the side of the body portion remote the bottom wall for engaging a spigot inserted into the bell end, and a forward portion of the gasket offset the bottom of the gasket and being further from the sealing lip portion than the bottom of the gasket for being engaged by the bent over offset forward wall portion and being locked thereby when the foward wall portion is bent over to secure the forward portion of the gasket, the steps of inserting the gasket into the bell with the rear portion of the gasket abutting the rearward wall of the groove and the bottom wall of the gasket abutting the bottom of the groove, and bending the offset forward wall portion over the offset forward portion of the gasket and pushing it into the mouth of the bell over the front portion of the gasket, thereby locking the gasket at the leading edge of the bell whereby when the offset forward wall portion, having been bent over the gasket locks the leading edge of the gasket at the mouth of the bell and with the rearward portion of the gasket abutting the rearward wall, when a spigot is inserted into the bell and engages the sealing lip, the sealing lip is permitted to stretch, decreasing the radial thickness of the gasket as the spigot is inserted, thus reducing the required insertion force for inserting the spigot into the bell without compromising the integrity of the seal and thus precluding the entry of foreign matter into the groove behind the gasket.

10. The process of claim 9, wherein the rearward wall of the groove extending away from the bottom forms an arc directed towards the mouth of the bell.

11. The process of claim 10, wherein the arc is an arc of a circle.

12. The process of claim 11, wherein the rearward wall of the groove extending away from the body terminates in a lip directed longitudinally towards the mouth of the bell.

13. The process of claim 9, 10 or 11, wherein the inwardly-extending wall extending inwardly from the forwardly-extending wall at the leading edge of the bell has a longitudinally-directed recess therein radially spaced from the bottom wall of the groove and the annular generally radially extending leading portion of the gasket comprises a projection of the same shape and size as the recess for being inserted into the recess.

14. The process of claim 10, wherein the rearward wall of the groove extending away from the body terminates in a lip directed longitudinally towards the mouth of the bell.

15. The process of claim 9, wherein the rearward wall of the groove extending away from the body terminates in a lip directed longitudinally towards the mouth of the bell.

16. The process of claim 15, 14 or 12, wherein the inwardly-extending extending wall extending inwardly from the forwardly-extending wall at the leading edge of the bell has a longitudinally-directed recess therein radially spaced from the bottom wall of the groove and the annular generally radially extending leading portion of the gasket comprises a projection of the same shape and size as the recess for being inserted into the recess.

17. A process of manufacturing a tubular member-gasket assembly is provided whereby a gasket is secured in the end of a tubular member, the tubular member having a central longitudinal axis, a mouth at its very end and an annular groove axially spaced from said mouth for receiving the gasket, the annular groove presenting a bottom wall, one end of the bottom wall being proximate the mouth and the other end being axially spaced from said mouth, said bottom wall having at said end proximate said mouth a generally radially-extending wall extending generally away from the central longitudinal axis, and said bottom wall having at its other end axially spaced from the said mouth a radially-extending wall extending toward the central longitudinal axis and being angled about 90 degrees to the bottom wall, the wall extending generally radially away from the central longitudinal axis carrying at its end a longitudinally-extending wall extending towards the mouth and being bent over at its end to provide a bent over portion extending into the end of the generally tubular member, the gasket comprising a body of resilient yieldable material carrying an integral sealing lip, the body having a central longitudinal axis and having opposed ends interconnected by a bottom wall substantially parallel to the axis for seating on the bottom wall of the groove, one opposed end of the gasket terminating in a generally radially-extending wall for engaging the radially-extending wall at the end of the bottom of the groove extending towards the central longitudinal axis of the tubular member and spaced from the mouth, the other opposed end of the gasket comprising a portion extending generally angularly away from the body for being engaged between the bent over portion and the generally radially-extending wall extending away from the central longitudinal axis, the integral sealing lip portion being on the side of the body portion of the gasket opposite the bottom and extending angularly away from the body and the mouth of the tubular portion and terminating at an end portion radially spaced from the body on the side of the body closer the central longitudinal axis of the tubular member than the bottom of the groove, the process comprising the steps of:

(a) placing the gasket in the mouth of the tubular member with the opposed end of the gasket comprising the portion extending generally angularly away from the body away from the central longitudinal axis abutting against the generally radially-extending wall extending away from the central longitudinal axis of the tubular member and the opposed end of the gasket terminating in a generally radially-extending wall extending towards the central longitudinal axis engaging the radially-extending wall at the end of the bottom of the groove extending towards the central longitudinal axis of the tubular member at an angle of about 90 degrees, and (b) bending over the longitudinally-extending wall extending towards the mouth to provide a bent-over portion extending into the end portion of the generally tubular member for sandwiching the opposed end of the gasket comprising the portion extending generally angularly away from the body away from the central longitudinal axis between the bent over portion of the longitudinally-extending wall and the generally radially-extending wall extending away from the central longitudinal axis of the tubular member with the generally radially-extending wall of the opposed end of the gasket abutting against the radially-extending wall extending toward the central longitudinal axis and angled about 90 degrees, thereby locking the gasket at the mouth of the tubular member.

18. The process of claim 17, wherein the radially-extending wall extending toward the central longitudinal axis is angled less than about 90 degrees.

19. The process of claim 17, wherein the radially-extending wall extending toward the central longitudinal axis is angled substantially 90 degrees to the longitudinal axis.

20. The process of claim 17, 18 or 19, wherein the generally radially-extending wall extending from the bottom of the groove away from the central longitudinal axis of the tubular member extends away from central longitudinal axis at an angle of about 90 degrees thereto and the portion of the gasket extending generally angularly away from the body may extend radially away at an angle of about 90 degrees to the longitudinal axis of the body.

21. The process of claim 17, 18 or 19, wherein the generally radially-extending wall extending from the bottom of the groove away from the central longitudinal axis of the tubular member comprises a recess opening therethrough (into the tubular member material) spaced from the bottom of the groove and the portion of the gasket extending generally angularly away from the body may carry a portion for sitting in the recess.

22. The process of claim 17, 18 or 19, wherein the end portion of the sealing lip portion overlies the body of the gasket so that the end portion of the sealing lip portion engages the gasket body when the sealing lip is folded onto the body of the gasket.

23. The process of claim 17, 18 or 19, wherein the radially-extending wall at the other end of the bottom of the groove extending toward the longitudinal axis terminates in a lip directed longitudinally towards the mouth of the tubular member.

24. The process of claim 17, 18 or 19, wherein the generally radially-extending wall extending away from the central longitudinal axis proximate the mouth of the tubular member has a longitudinally-directed recess therein directed in a direction longitudinally away from the mouth and radially spaced from the bottom wall of the groove and the other end of the gasket comprising a portion extending generally angularly away from the body for being engaged between the bent over portion and the generally radially-extending wall extending away from the central longitudinal axis of the tubular member comprises a projection of the same shape and size as the recess for lodging in the longitudinally-directed recess.

25. The process of claim 17, wherein the radially-extending wall at the other end of the bottom of the groove extending toward the longitudinal axis may form an arc directed towards the mouth of the tubular member.

26. The process of claim 25, wherein the arc may be an arc of a circle.

* * * * *